United States Patent [19]

Sullivan

[11] 4,264,348

[45] Apr. 28, 1981

[54] BUSHING BLOCKS

[75] Inventor: Timothy A. Sullivan, Columbus, Ohio

[73] Assignee: Owens-Corning Fiberglas Corporation, Toledo, Ohio

[21] Appl. No.: 77,867

[22] Filed: Sep. 21, 1979

[51] Int. Cl.³ .............................................. C03B 37/00
[52] U.S. Cl. .............................................. 65/1; 65/2;
65/11 R; 65/11 W; 65/134; 65/346
[58] Field of Search ....................... 65/1, 2, 134, 11 R,
65/11 W, 346

[56] References Cited

U.S. PATENT DOCUMENTS

| 2,411,031 | 11/1946 | Deyrup | 65/134 |
| 3,028,442 | 4/1962 | Glaser | 65/1 X |
| 3,556,753 | 1/1971 | Glaser | 65/134X |
| 3,630,708 | 12/1971 | Ihrig | 65/134 X |

Primary Examiner—Robert L. Lindsay, Jr.
Attorney, Agent, or Firm—Ronald C. Hudgens; Philip R. Cloutier

[57] ABSTRACT

Apparatus and method for mixing molten glass as it flows from a bushing block into a bushing is disclosed. The bushing block is divided into a plurality of sections and the glass is flowed in a plurality of streams for intermixing prior to entry into the bushing.

9 Claims, 6 Drawing Figures

000
BUSHING BLOCKS

BACKGROUND OF THE INVENTION

This invention relates to a bushing block. In one of its more specific aspects, this invention relates to means for minimizing temperature variations of liquid glass within a bushing.

The formation of glass fibers by drawing streams of glass from an apertured bushing is well known. In most instances, the glass is caused to flow from a melting source, through a bushing block and into a bushing. Streams of glass are drawn through the apertures thereof and are collected by winding as one or more packages on a collet driven by a winder.

It has been observed, particularly when two or more packages are being formed from fibers drawn from one bushing, that there can exist considerable variation in the diameter of fibers drawn from different areas of the bushing. This is attributable to a temperature imbalance between areas of the bushing block and hence, of the glass. As a result of this imbalance, there arise problems of yardage control, strand tension and package builds.

Measurements indicate that temperature variations of 100° F., or more, can exist along the length of the bushing block at the interface between the bushing block and the bushing. Generally, bushings do not have the capacity of balancing temperature differences of this magnitude during the short residence time of the glass in the bushing.

The bushing block of this invention significantly reduces such temperature differentials within the bushing and, while particularly suitable for the production of two or more packages from the same bushing, can be used for single package production.

STATEMENT OF THE INVENTION

According to this invention there is provided a bushing block having an opening positioned therein, the opening being divided into a plurality of sections by a separation wall. Each of the sections is adapted with two longitudinally inclined flow planes forming a passage therebetween at their terminals, the passageway extending through the block.

In one of the preferred embodiments, the flow planes are inclined both along their lengths and across their widths.

Also, according to this invention there is provided a method of introducing glass from a supply means into a bushing which comprises flowing glass into the sections of a bushing block divided along its length into a plurality of sections and flowing glass down inclined planes positioned in each of said sections and into openings formed between the planes and into the bushing.

The bushing block of this invention divides the input glass to the bushing into two or more portions along the length of the block. As the glass flows down the inclined planes, additional mixing takes place. Then, because the glass is distributed within the bushing into areas substantially opposite to those which it occupied in the block, additional mixing takes place. Depending upon the configuration of the ends of the inclined planes, additional mixing can be made to occur. Further, if the flow planes are inclined inwardly towards the separation wall or outwardly toward the bushing block outer wall, additional temperature equilization between the flowing streams takes place.

DESCRIPTION OF THE DRAWINGS

The apparatus of this invention will be more easily understood if explained in conjunction with the attached drawings in which:

Referring now to the drawing in detail, FIG. 1 illustrates a melting furnace 10 which discharges molten glass through channel 13 in forehearth 12, through flow block 14 and bushing block 15 and therefrom into bushing 16. Glass filaments 24 are pulled therefrom, sized on applicator 32, gathered at shoes 34 for winding in package 27 on winder 30, all being well known in the art.

Figure 1:
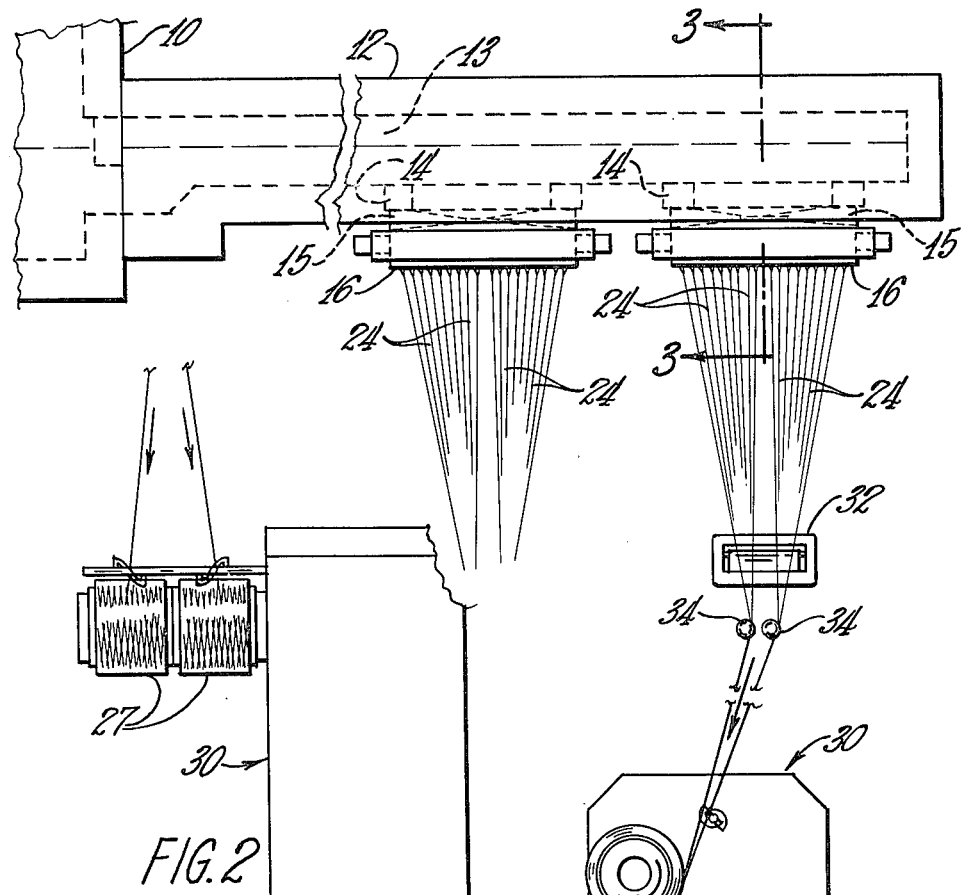
FIG. 1 is an elevational view of a furnace forehearth, bushing block, bushing and winder.
Figure 2:
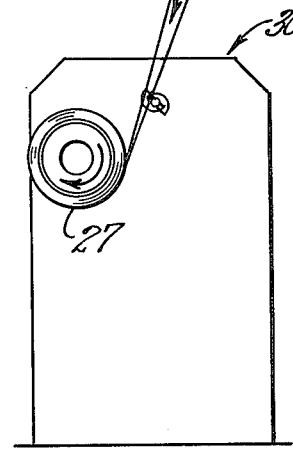
FIG. 2 is an elevational view of a winder collecting two packages.
Figure 3:
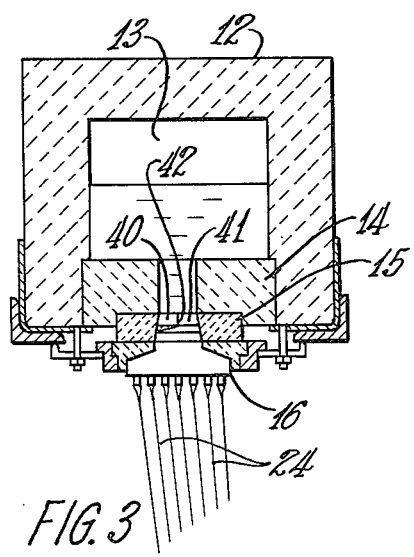
FIG. 3 is a cross sectional view of the forehearth and associated equipment through section 3—3 of FIG. 1.

The strand can be accumulated in one or more packages 27 as shown in FIG. 2.

Figure 4:
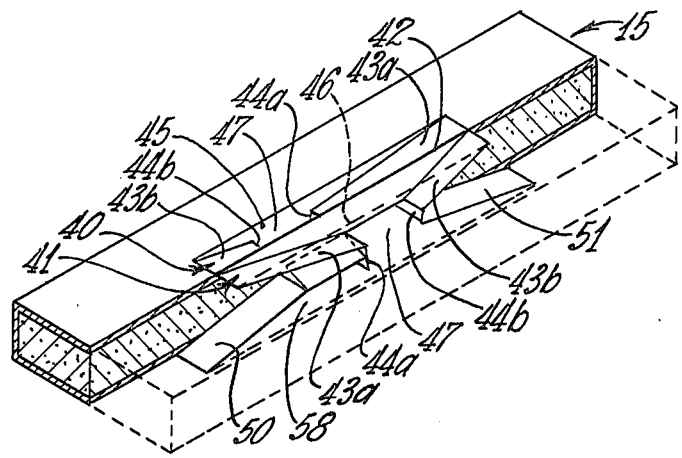
FIG. 4 is an isometric view of one half of the bushing block.

As seen in FIG. 4, bushing block 15 is comprised of two sections 40 and 41, these sections being separated by a vertically upstanding separation wall 42. Each section is comprised of two inclined flow planes 43a and 43b. These planes can be of equal or unlike length in respect to each other and in respect to the associated flow planes in the adjoining section. Each of these flow planes can optionally terminate in a riser 44a and 44b, the optional risers in combination with the separation wall and sidewalls 45 and 46 forming openings 47 for the passage of the glass from the block into the bushing positioned therebeneath. Plates 50 and 51 act to support the inclined flow planes, plates 50 and 51 being upwardly inclined to form space 58 above the bushing. If the inclined flow planes are of unlike lengths both with respect to themselves and with respect to those on the adjoining section, there will be formed two openings 47, each of which lies at different points along the length of wall 42. Preferably, for the purpose of facilitating more thorough mixing, each of the downwardly inclined flow planes can be inclined towards separation wall 42 or sidewalls 45 and 46, the angle and direction of inclination being a matter of choice.

Figure 6:
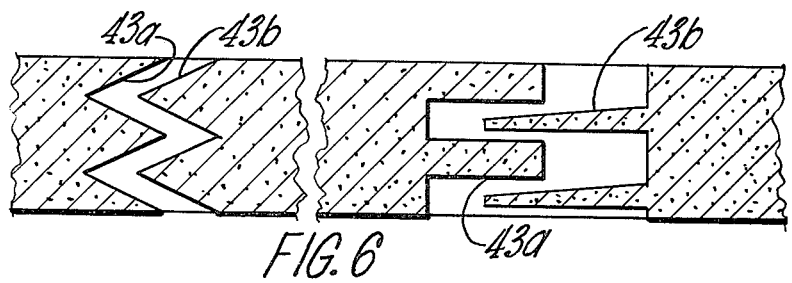
FIG. 6 is a view of two of the many possible terminations of the inclined flow planes.

While, as stated above, each of the flow planes can terminate in a riser 44a and 44b, the flow planes can extend beyond the risers and terminate in irregular end configurations such as shown in FIG. 6 for the purpose of further facilitating mixing.

The openings 47 formed at the ends of the flow planes can be located anywhere along the length of the block. Preferably, they will be positioned such that their opposite ends terminate in the same vertical plane.

Figure 5:
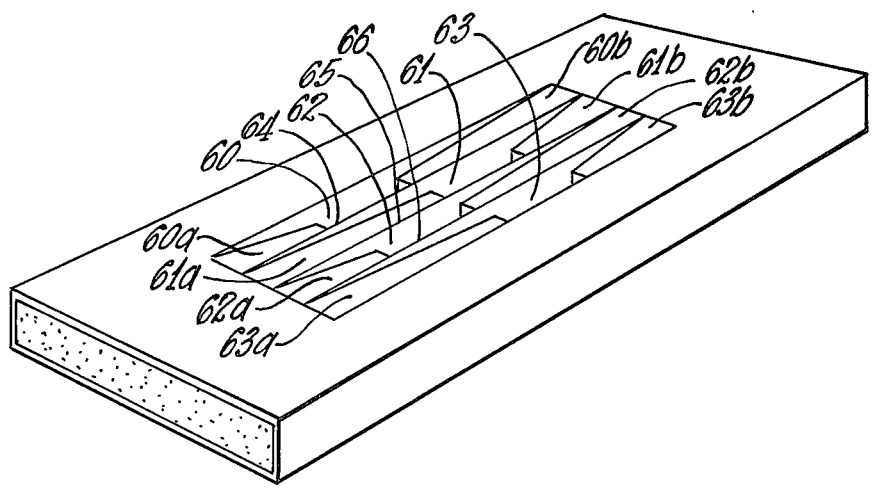
FIG. 5 is an isometric view of one embodiment of the bushing block.

The flow block need not be limited to two sections comprising a pair of inclined flow planes separated by a wall but, as shown in FIG. 5, can be comprised of a plurality of sections 60, 61, 62 and 63 each formed of its flow planes 60a, 60b, 61a, 61b, 62a, 62b, each of the sections be separated by a separation wall, 64, 65 and 66.

The structure of the apparatus as described implies the presence of voids within the apparatus. These, of course, can advantageously be filled with any suitable high temperature refractory.

It will be evident from the foregoing that various modifications can be made to the apparatus of this invention. Such, however, are within the scope of the invention.

I claim:

1. A bushing block for the production of glass fibers having an opening formed therein:
   (a) a vertically upstanding separation wall dividing said opening into a plurality of sections; and,
   (b) two longitudinally inclined flow planes positioned within each of said sections, said inclined flow planes terminating in a passage therebetween, said passage extending through said block.

2. The bushing block of claim 1 in which said flow planes are angularly inclined across their width.

3. The bushing block of claim 1 in which said bushing block is comprised of one separation wall dividing said opening into two sections.

4. The bushing block of claim 1 in which each of said flow planes in each of said sections are of unlike length.

5. The bushing block of claim 1 in which said flow planes terminate in a riser.

6. The bushing block of claim 1 in which said flow planes extend beyond a riser.

7. The bushing block of claim 1 in which said bushing block is comprised of a plurality of separation walls dividing said opening into a plurality of sections.

8. A method of introducing glass from a supply means into a bushing for the production of glass fibers which comprises flowing the glass into a bushing block divided into sections along its length, flowing the glass down inclined planes positioned in said sections, and flowing the glass through an opening formed between the terminus of said inclined planes into said bushing.

9. The method of claim 8 in which said glass is flown across a portion of the width of said planes.

* * * * *